(12) United States Patent
Ichikawa

(10) Patent No.: US 6,351,707 B1
(45) Date of Patent: *Feb. 26, 2002

(54) NAVIGATION SYSTEM AND METHOD FOR CALCULATING A GUIDE ROUTE

(75) Inventor: Shigeru Ichikawa, Iwaki (JP)

(73) Assignee: Alpine Electronics, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,707

(22) Filed: Feb. 25, 1998

(30) Foreign Application Priority Data

Feb. 25, 1997 (JP) ............................................. 9-056944

(51) Int. Cl.7 .......................... G01C 21/00; G08G 1/123
(52) U.S. Cl. ....................................... 701/209; 340/994
(58) Field of Search ................................ 701/209, 210, 701/204; 340/994

(56) References Cited

U.S. PATENT DOCUMENTS

| | | | |
|---|---|---|---|
| 5,371,678 A | * 12/1994 | Nomura ...................... 340/995 |
| 5,406,490 A | * 4/1995 | Braegas ...................... 340/995 |
| 5,428,545 A | 6/1995 | Maegawa et al. ............ 364/444 |
| 5,568,390 A | 10/1996 | Hirota et al. ................ 364/449 |
| 5,845,227 A | * 12/1998 | Peterson ...................... 701/209 |
| 5,878,368 A | * 2/1999 | DeGraaf ...................... 701/209 |
| 5,911,773 A | * 6/1999 | Mutsuga et al. ............. 701/210 |
| 5,933,100 A | * 8/1999 | Golding ...................... 340/995 |
| 6,098,015 A | * 8/2000 | Nimura et al. .............. 701/209 |

* cited by examiner

Primary Examiner—Gregory C. Issing
(74) Attorney, Agent, or Firm—Brinks Hofer Gilson & Lione

(57) ABSTRACT

The invention provides a navigation system that is able to accurately calculate the cost during searching or guiding a route. The navigation controller of the navigation system is comprised of a map buffer that stores various data for displaying maps and searching routes, a route search processor for searching routes, a guide route memory, and a route search memory. When the search key of the remote control unit is pressed, the route search processor makes an intersection network list necessary for a route search between two intersections to store in the route search memory. Further, the route search processor modifies a link cost in the route search memory by replacing it with a statistical cost representing a statistically obtained time that is required for actually passing through the road link, and executes the route search on the basis of the modified cost data.

12 Claims, 8 Drawing Sheets

FIG. 3(A)

NODE TABLE

| #0 NODE RECORD |
|---|
| #1 NODE RECORD |
| #2 NODE RECORD |
| ⋮ |

FIG. 3(B)

CONNECTION NODE TABLE

| NORMALIZED LONGITUDE OF NODE |
|---|
| NORMALIZED LATITUDE OF NODE |
| NODE ATTRIBUTE FLAG |
| CONNECTED NODE NUMBER |
| NUMBER OF TRAFFIC REGULATIONS |
| ⋮ |
| #0 CONNECTION NODE RECORD (LINK NUMBER) |
| #1 CONNECTION NODE RECORD (LINK NUMBER) |
| ⋮ |
| #0 TRAFFIC REGULATION RECORD |
| #1 TRAFFIC REGULATION RECORD |
| ⋮ |
| ADJOINING NODE RECORD |
| STORAGE LOCATION OF INTERSECTION RECORD |
| SIZE OF CORRESPONDING INTERSECTION RECORD |

FIG. 3(C)

LINK TABLE

| #0 LINK RECORD |
|---|
| #1 LINK RECORD |
| #2 LINK RECORD |
| ⋮ |

LINK RECORD

| LINK ID |
|---|
| NODE No.1 |
| NODE No.2 |
| DISTANCE |
| STATISTICAL COST (FROM NODE 1 TO NODE 2) |
| STATISTICAL COST (FROM NODE 2 TO NODE 1) |
| ROAD ATTRIBUTE FLAG |
| ROAD TYPE FLAG |
| ROUTE NUMBER |
| ⋮ |

| ADDRESS | |
|---|---|
| F 0 0 0 | START POINT DATA (NODE NS) |
| F 0 0 0 | NODE N1 |
| F 0 0 0 | NODE N2 |
| | ⋮ |
| F F F F | DESTINATION DATA (NODE ND) |

NAVIGATION SYSTEM AND METHOD FOR CALCULATING A GUIDE ROUTE

BACKGROUND OF THE INVENTION

1. Field of the Invention

The present invention relates to a navigation system that sets an optimum path to connect a start point to a destination by means of a route search.

2. Description of the Related Art

Generally, the car navigation system detects the present position of a car, reads out the map data near the position of the car from the CD-ROM, and illustrates it on the display. On the center of the display screen, a vehicle position marker is presented to indicate the position of the car. The adjoining map data is scrolled around this vehicle position marker as the car travels, so that the map information around the present position of the car can always be obtained.

Usually, the car navigation system contains a route guiding function that enables a driver to travel to a desired destination without taking a wrong path. This route guiding function automatically searches, using a search layer data stored in the CD-ROM, a route of the lowest cost to connect from the start point to the destination by means of a simulated calculation such as the lateral search (BFS) method or the Dijkstra method, and stores the searched route as a guide route. While traveling, the route guiding function displays the map to draw the guide route thick with a different color from those of the other roads. And, when the car approaches an intersection where to change the course on the guide route within a certain distance, the route guiding function presents an enlarged view of the intersection and displays the traveling direction with an arrow, and so forth, thereby guiding the driver to the destination.

The foregoing cost is defined in the dimension of time, and contains a time required for passing through a section and a time required for passing through an intersection, etc. Generally, the route guiding function sets the average speed of a car on the basis of the width of a road and the type of a road (general road, or highway), etc., and obtains a time required for passing through the road, and on this time it adds a time in which the right-turn and left-turn, and the like at the intersection are taken into consideration to thereby obtain the cost.

However, the cost of a road used in searching a route is calculated on the basis of the average vehicle speed estimated in correspondence with the type of a road and the like, and in many cases it does not reflect the real circumstances of the road, which can be a hindrance to obtain a correct route. Suppose two national roads with the same width, for example, one of which passes through an urban area and another one is a by-pass to divert this urban area. In this case, the times required for passing through an identical distance on both the roads are different greatly; and therefore, if the times required for passing through these roads are calculated uniformly, it will not give a correct route.

Recently, the vehicle information communication system (VICS) has been put to practical use, which provides a dynamic information on a traffic jam reflecting the real circumstances of a road. However, the VICS service does not cover the whole country, and outside of the VICS service, the cost calculation based on the average vehicle speed is still carried out, so that a correct route search cannot be achieved.

Further, since the real circumstances of a road is not reflected as described above, the calculation of a required time for the guide route obtained as a result of the route search and an estimated time when to reach the destination will contain a large error, which makes a correct display impossible.

SUMMARY OF THE INVENTION

The present invention has been made in view of the foregoing problems, and an object of the present invention is to provide a navigation system that is able to make a correct calculation of the cost while searching or guiding a route.

In order to accomplish the foregoing object, the navigation system of the present invention is provided with search data storage means that stores search data including a statistical required time to represent an actual time required for passing through a road, and route search processing means that searches a route by using the search data so as to connect a start point to a destination when the two are specified. Further, the route search processing means searches a route, when a traffic information from the VICS center is available, by using the search data including a required time to pass through a road obtained on the basis of the traffic information. And, when the traffic information is not available, the route search processing means searches a routeby using the search data including the statistical required time. Thus, according to the invention, the cost during the route search can accurately be calculated by using the search data including the statistical required time, which leads to a route search that reflects an actual road condition.

Further, the foregoing search data contain a by-pass road flag to indicate whether each of the roads is a by-pass road or not. As to a road where the foregoing statistical required time or the traffic information is not available, the route search processing means precedently sets a road that is judged as a by-pass road as a guide route on the basis of the by-pass road flag. If two roads have the same road type and the same road width, the required time to pass through a road greatly differs depending on whether it is a by-pass road or a general road passing through an urban area. To give the priority to a by-pass road will set a guide route that is more accordant to the real condition of a road.

Further, the navigation system of the invention is provided with route guiding means that guide a car to a destination in accordance with the guide route, road data storage means that stores road data containing an actual time required for passing through a road contained in the guide route as the statistical required time, and required time calculation means that calculates an estimated arrival time at the destination or a required time to reach the destination to inform the driver of the calculation result, on the basis of the statistical required time stored in the road data storage means, while guiding a route by the route guide means. Since the estimated arrival time at the destination or the required time to the destination is calculated by using the statistical required time, an accurate display becomes possible, wherein the real road conditions are taken into account.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings;

FIGS. 3(A), 3(b), and 3(C) illustrate detailed contents of various tables contained in the road data unit;

DETAILED DESCRIPTION OF THE EMBODIMENT

The navigation system wherein the present invention is applied uses the statistical cost obtained by practically investigating a congestion on a road as the cost of a road used in the route search. Therefore, the navigation system is characterized by performing the route search that accurately reflects the real circumstances of roads even outside the service area of the VICS. One embodiment of the navigation system will hereafter be described with the accompanying drawings.

(1) TOTAL CONSTRUCTION OF THE NAVIGATION SYSTEM

Figure 1:
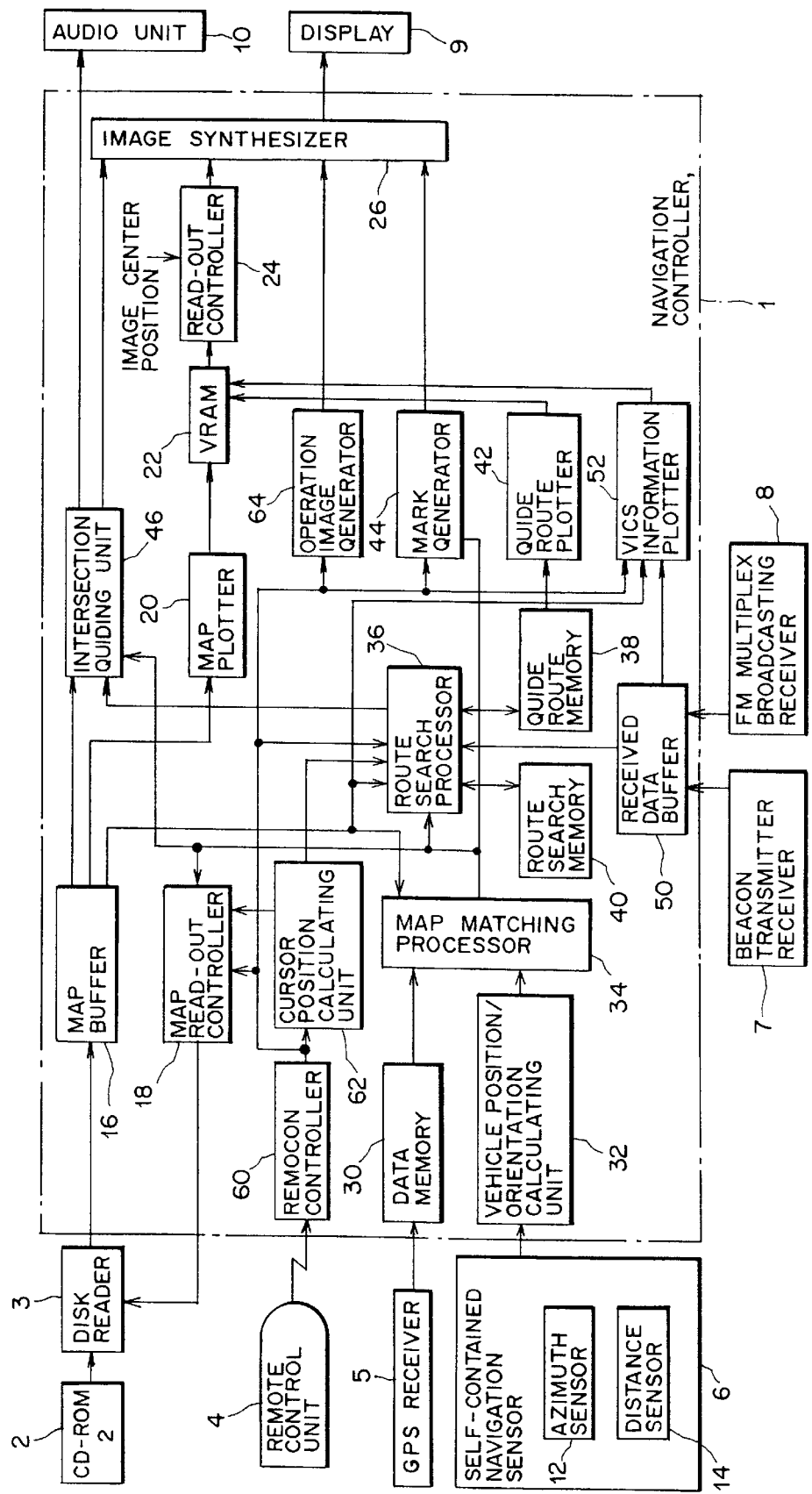
FIG. 1 is a total block diagram of a car navigation system of one embodiment wherein the present invention is applied.

FIG. 1 is a total block diagram of the car navigation system relating to the embodiment wherein the invention is applied. The navigation system shown in FIG. 1 contains a navigation controller 1 to control the whole system, a CD-ROM 2 wherein various map data necessary for displaying maps and for searching routes are recorded, a disk reader 3 to read out the map data recorded in the CD-ROM 2, a remote control unit 4 as an operation board through which a driver or an occupant of the car enters various instructions, a GPS receiver 5 and a self-contained navigation sensor 6 to detect the position and orientation of the car, a beacon transmitter receiver 7 and an FM multiplex broadcasting receiver 8 that receive traffic information transmitted from the vehicle information center (VICS center), a display 9 to illustrate a map image and a guide route to be superimposed thereon, and an audio unit 10 to emit a specific guide voice during guiding a route.

The foregoing disk reader 3 can be loaded with one or more CD-ROMs 2, and reads out a map data from any one of the CD-ROMS 2 to be controlled by the navigation controller 1. The remote control unit 4 is provided with various operation keys such as a search key for giving an instruction to search a route, a route guide mode key used for setting the route guide mode, a destination input key, a lateral/vertical cursor key, a map reduction/expansion key, and a set key to determine the item on the cursor position displayed on the image plane; and transmits the infrared signal corresponding to the key operation to the navigation controller 1.

The GPS receiver 5 receives radio waves transmitted from a plurality of GPS satellites, executes a three-dimensional or two-dimensional measurement on a position, calculates the absolute position and orientation of a car (the orientation of a car is calculated on the basis of the present position of the car and the position of the car before one sampling time $\Delta$ T), and outputs the calculation result with the measurement time. The self-contained navigation sensor 6 is provided with an azimuth sensor 12 of a vibrational gyro that detects a turning angle of a car as a relative azimuth, and a distance sensor 14 that outputs one pulse at every predetermined traveling distance, and thereby detects a relative position and orientation of a car.

The beacon transmitter receiver 7 communicates interactively with a wave beacon transmitter receiver installed mainly on a highway through a radio wave, communicates interactively with an optical beacon transmitter receiver installed mainly on a general road through a laser beam, and thereby receives the VICS information transmitted from the VICS center. The FM multiplex broadcasting receiver 8 receives the VICS information contained in the multiplexed data superimposed on the general FM broadcasting waves. The foregoing wave beacon transmitter receiver, optical beacon transmitter receiver, and FM multiplex broadcasting receiver do not basically differ in that all of them can receive the VICS information, and in the contents of the receivable information. However, the FM multiplex broadcasting receiver is able to receive the traffic information in a wider area than the other two.

The display 9 presents the map information around the car accompanying with the car position mark, start point mark, and destination mark, etc., and the guide route on the map.

(2) DETAILED CONTENTS OF THE MAP DATA

Next, the map data recorded in the CD-ROM 2 will be described in detail. The map data recorded in the CD-ROM 2 is comprised of sheets of map data divided by a specific longitude and latitude, and each of the sheets of map data (hereunder, referred to as a map sheet) is processed as one data unit. The map data in the map sheets are specified and read out by designating a map sheet number. Each map data in each map sheet contains: (1) a plotting data unit comprised of various data required for presenting maps, (2) a road data unit comprised of various data required for the processings such as the map matching, route search, route guide, etc., and (3) an intersection data unit comprised of the detailed information of intersections. The foregoing plotting data unit contains data of the VICS conversion layer necessary for specifying a corresponding road on the basis of the vehicle congestion information transmitted from the VICS center, data of the background layer necessary for presenting buildings or rivers, etc., and data of the character layer necessary for presenting the names of cities and towns, and roads, etc.

Figure 2:
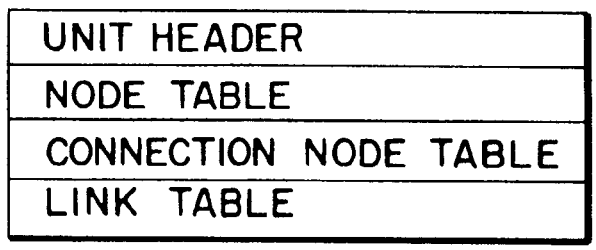
FIG. 2 illustrates a total configuration of a road data unit.

In the foregoing road data unit, a line connecting an intersection on a road and another intersection adjoining thereto is called as a link, and an intersection to connect more than two links is called as a node. FIG. 2 illustrates a total configuration of the foregoing road data unit. As shown in FIG. 2, the road data unit comprises a unit header to identify the unit itself, a connection node table to store the detailed data of the whole nodes, a node table to indicate a location where the connection node table is stored, and a link table to store the detailed data of the link specified by adjoining two nodes.

FIG. 3 illustrates the detailed contents of various tables contained in the road data unit. As shown in FIG. 3 (A), the node table stores node records #0, #1, . . . corresponding to the whole nodes contained in a map sheet being watched. The node records are given the node numbers sequentially from #0 in the list order, and each of the node records indicates a location where the connection node table corresponding to each of the nodes is stored.

The connection node table comprises the following data in respect to each of the existing nodes, as shown in FIG. 3(B).

a. normalized longitude, normalized latitude,
b. node attribute flag consisting of an intersection node flag to indicate whether or not the concerned node is an intersection node, and an adjoining node flag to indicate whether or not the concerned node lies on the boundary between the other map sheet and the map sheet containing the concerned node,
c. connected node number to indicate the number of nodes forming the other ends of links, if there are links connecting to the concerned node as the one end of the links,
d. number of traffic regulations, if there are traffic regulations such as no right-turn or no U-turn as to the link connected to the concerned node,
e. connection node record to indicate the link number of the link connecting to the concerned node as the one end,
f. traffic regulation records to indicate the concrete contents of the traffic regulations, if there are the foregoing traffic regulations, in correspondence with the number of the traffic regulations,
g. adjoining node record to indicate the location of the connection node table of the corresponding node in the adjoining map sheet, if the concerned node lies on the boundary between the other map sheet and the one containing the concerned node, and
h. storage location of the corresponding intersection record in the intersection data unit, and the size of the corresponding intersection record, if the concerned node is an intersection node.

And, the link table comprises, as shown in FIG. 3(C), a plurality of link records in the order of the link numbers corresponding to the whole links contained in a map sheet being watched, such as:

a. link ID being a code applied to each link, mainly for displaying the search route,
b. node number 1, and node number 2 to specify the two nodes located at both ends of a link,
c. distance of a link,
d. statistical cost that the time required for actually traveling the concerned link is obtained by means of a statistical technique and the time required for passing through the link is indicated by the minute,
e. road attribute flag containing a VICS link flag to indicate whether or not the concerned link corresponds to the VICS link controlled by the VICS center, and a by-pass road flag to indicate whether or not the road corresponding to the concerned link is a by-pass road, etc.,
f. road type flag to indicate the type of roads that the road corresponding to the concerned link is a general road or a highway, and
g. route number given to the road corresponding to the concerned link.

Figure 4:
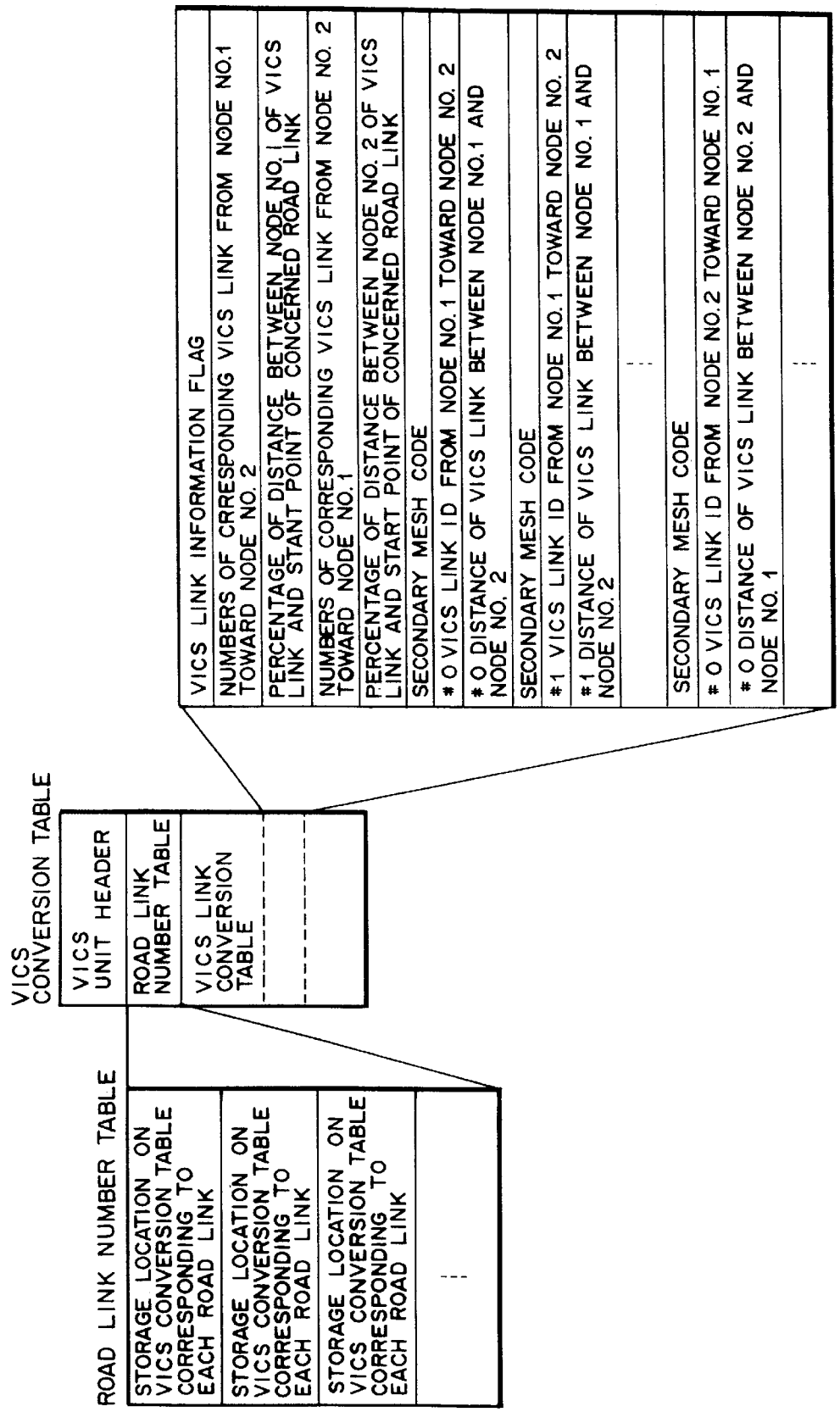
FIG. 4 illustrates detailed contents of the VICS conversion layer contained in a plotting data unit.

FIG. 4 illustrates detailed contents of the VICS conversion layer contained in a plotting data unit. As shown in FIG. 4, the VICS conversion layer of the plotting data unit comprises a VICS conversion table, and the VICS conversion table comprises a VICS unit header to be identified as the VICS conversion table, a road link number table, and a VICS link conversion table. The road link number table is to indicate, in the order of the road link numbers, the location where the data of the road link (the link contained in the road data unit is named specially as the "road link" in order to distinguish it from the VICS link) are stored in the VICS conversion table, and it covers the whole links in the map sheet being watched.

And, the VICS link conversion table comprises in correspondence with each of the existing road links:

a. VICS information flag containing a VICS link length to indicate a relative length between a VICS link and road link, and an upward/downward distinction to indicate whether the upward and downward lines of the road link being watched are different or same,
b. number of corresponding VICS links when the road link being watched is observed from one node toward the other node,
c. distance between one node of a VICS link and the starting position of the concerned road link (percentage of the distance against the whole distance of the VICS link),
d. number of corresponding VICS links when the road link being watched is observed from the other node toward one node,
e. distance between the other node of a VICS link and the starting position of the concerned road link (percentage of the distance against the whole distance of the VICS link),
f. secondary mesh code, VICS link ID, distance to a VICS link corresponding to each of the VICS links when observing from one node of a road link toward the other node thereof,
g. secondary mesh code, VICS link ID, distance to a VICS link corresponding to each of the VICS links when observing from the other node of a road link toward one node thereof.

(3) DETAILED CONSTRUCTION OF THE NAVIGATION CONTROLLER AND THE OPERATION

Next, the detailed construction of the navigation controller 1 shown in FIG. 1 will be described. The navigation controller 1 contains a map buffer 16 to put out a specific map on the display 9 on the basis of a map data read out from the CD-ROM 2, a map read-out controller 18, a map plotter 20, a VRAM 22, a read-out controller 24, an image synthesizer 26, a data memory 30 that executes a calculation of a position of the car and a map matching processing, a route search processing, and a route guide processing and presents the results of the above, a vehicle position/orientation calculating unit 32, a map matching processor 34, a route search processor 36, a guide route memory 38, a route search memory 40, guide route plotter 42, a mark generator 44, an intersection guiding unit 46, a received data buffer 50 to present the VICS information received by the beacon transmitter receiver 7, etc., a VICS information plotter 52, a remote control unit controller (hereinafter, remocon controller) 60 that presents various images for operations to the user and transmits operation instructions from the remote control unit 4, a cursor position calculating unit 62, an operation image generator 64.

The map buffer 16 is to temporarily store the map data read out by the disk reader 3 from the CD-ROM 2. The map read-out controller 18 calculates an image center position, and then transmits an instruction to read out the map data within a specific range including the foregoing image center position to the disk reader 3. The disk reader 3 reads out the map data necessary for displaying the map from the CD-ROM 2, which is stored in the map buffer 16. The disk reader 3 reads out, for example, the map data corresponding to four map sheets including an image center position.

The map plotter 20 makes map images for the display, on the basis of the plotting data unit contained in the map data of the four map sheets. The map images thus made is stored in the VRAM 22, and the read-out controller 24 reads out the map image data for one image plane. The image synthesizer 26 synthesizes a map image by superimposing image data outputted from the mark generator 44, the intersection guiding unit 46, and the operation image generator 64, described later, on the read out map image data. The synthesized map image is put out on the display 9.

Figures 5, 6:
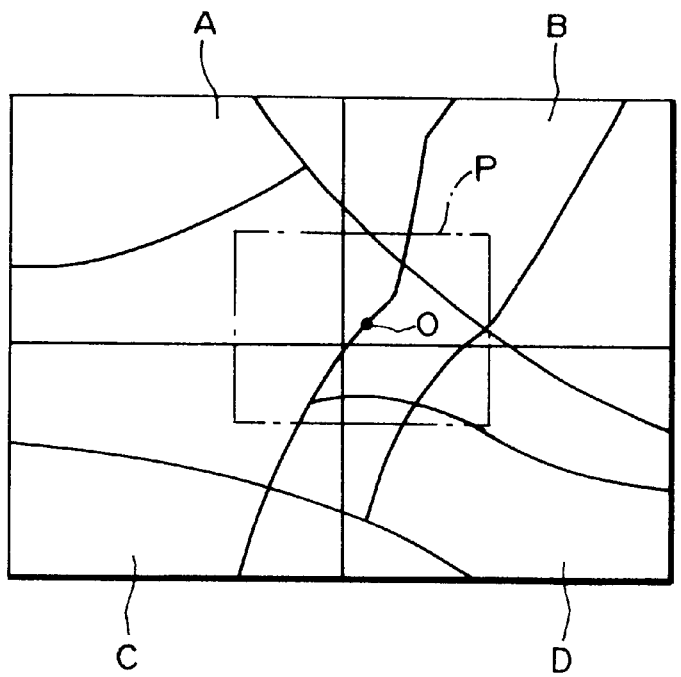
FIG. 5 illustrates a relation between a plotting area and a display area in the VRAM.
FIG. 6 illustrates one example of data stored in a guide route memory.

FIG. 5 illustrates a relation between a map image data stored in the VRAM 22 and a display image read out by the read-out controller 24. The regions A~D in FIG. 5 each represent the map images plotted on the basis of the plotting data unit contained in the map data of the four map sheets read out from the map buffer 16. The map image data of these four map sheets are stored in the VRAM 22. Further, the region P represents a display image data around the image center position O, read out by the read-out controller 24 from the VRAM 22. The region P moves, as the car travels to move the image center position O corresponding to the present position of the car, and the image plane is scrolled.

The data memory 30 sequentially stores measurement position data of the car outputted from the GPS receiver 5. The vehicle position/orientation calculating unit 32 calculates the absolute position and orientation of the car on the basis of the relative position and orientation of the car outputted from the self-contained navigation sensor 6. The map matching processor 34 determines whether or not there is the position of the car stored in the data memory 30 through the GPS receiver 5 or the position of the car calculated by the vehicle position/orientation calculating unit 32 on the road in the map data. If the position is deviated from the road, the position of the car obtained by the calculation is modified. As a typical map matching technique, the pattern matching and the projective method are known.

The route search processor 36 sets, when the cursor key of the remote control unit 4 is operated to move the cursor to a specific position on a map and then the destination input key is pressed, the cursor position calculated by the cursor position calculating unit 62 as a destination for the route search. The set destination data is stored in the guide route memory 38. And, when the search key of the remote control unit 4 is pressed, the route search processor 36 sets as a start point the position of the car that has already been modified by the map matching processor 34, and stores the start point data in the guide route memory 38. Further, the route search processor 36 searches the traveling routes connecting the start point and the destination stored in the guide route memory 38 under a specific condition. In consequence, the route search processor 36 sets, for example, a route of which cost becomes minimum under various conditions such as the shortest traveling time, the shortest traveling distance, and the priority to the general road, as the guide route. As a typical technique for the route search, the Dijkstra method and the lateral search method are known. The guide route thus set by the route search processor 36 is stored in the guide route memory 38.

FIG. 6 illustrates one example of data stored in the guide route memory 38. As shown in FIG. 6, the data of the guide route set by the route search processor 36 are represented by the set NS, N1, N2, . . ., ND from the start point to the destination, and are stored in the guide route memory 38.

The route search memory 40 is to store the data of the intersection network list required for the route search. The foregoing route search processor 36 reads out the stored data to search a specific route. The intersection network list will be detailed later.

The guide route plotter 42 selects the data contained in the map area plotted in the VRAM 22 at that time out of the guide route data stored in the guide route memory 38, and plots to superimpose a guide route on the map image with a specific color and thick line. The mark generator 44 generates a vehicle position mark at the position of the car after the map matching is processed, and a cursor mark having a specific shape.

The intersection guiding unit 46 gives a guidance of an intersection to which the car is approaching, with a display and sound. When the car approaches the intersection located in front of the guide route within a specific distance, the intersection guiding unit 46 presents a guide illustration (enlarged map of the intersection, destination, traveling direction arrow) of the approaching intersection on the screen of the display 9, and guides the traveling direction through the audio unit 10.

The foregoing map buffer 16 and the route search memory 40 correspond to search data storage means, the route search processor 36 to route search processing means, the statistical cost described later to a statistical required time, the guide route memory 38 and the guide route plotter 42 to route guiding means, the map buffer 16 to road data storage means, and the route search processor 36 to required time calculating means, respectively.

(4) THE OPERATION OF THE NAVIGATION SYSTEM

The total navigation system and the navigation controller 1 contain the foregoing configuration. The operation of the navigation system as to the route search connecting a start point to a destination will be detailed next. The intersection network list relating to a specific range including a start point and a destination is made and stored in the route search memory 40 in advance for the route search processor 36 to search a route (the specific range is defined, as an example, by one or more map sheets including the whole range of a rectangle of which diagonal line is formed of a straight line connecting the start point to the destination, or it is defined by the whole range of a circle of which radius is formed of a straight line connecting the start point to the destination). The intersection network list is made by extracting intersections (including adjoining nodes other than the intersections) out of the whole nodes contained in the road data unit and collecting various data required for the route search for each of the intersections.

For example, the intersection network list contains for each intersection:

(1) sequence number of the concerned intersection (consecutive number required for specifying the concerned intersection network list),
(2) map sheet number of the road data unit containing the concerned intersection,
(3) location on the node table,
(4) longitude/latitude,
(5) flag to indicate inside or outside of the VICS service area,
(6) number of nodes forming the concerned intersection,
(7) sequence number of the adjoining intersection, (8) cost to the adjoining intersection (average required time obtained from the average speed corresponding to the road width and road type of the link),
(9) road type, road width to each adjoining intersection,
(10) sequence number of the intersection directly before the concerned, determined by the route search,
(11) total of the cost from the start point to the concerned intersection, and
(12) degree of search of the concerned intersection (in case of the lateral search method). Here, (10) through (12) are registered while the route search is performed.

Generally, the intersection network list is contained in advance in the road data unit of the CD-ROM 2, and one confined to a certain range including a start point and a destination is read out to be stored in the route search memory 40. However, the intersection network list may be made at each time of the route search in accordance with the data from the road data unit of the map data. Further, in this embodiment, only the intersection is applied as the node for search, and the network list is expressed as the attribute of each node; however, the network list may be expressed as the attribute of the link to execute the route search.

Figure 7:
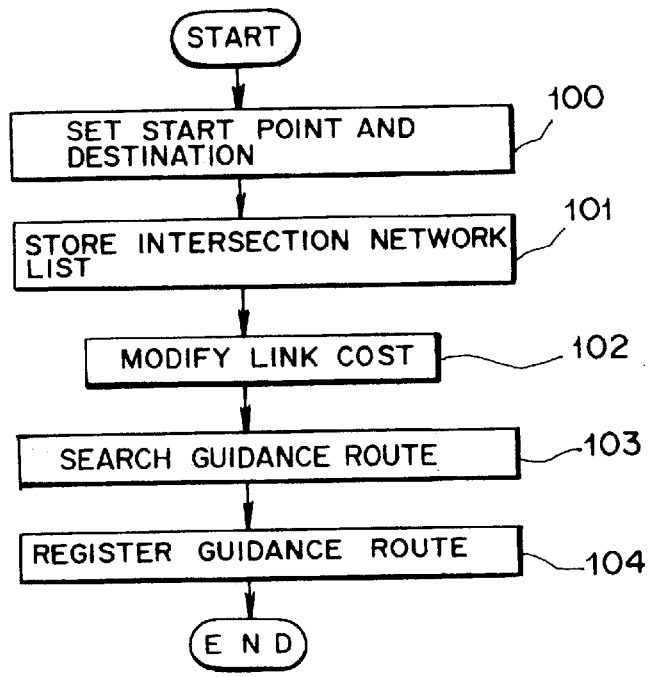
FIG. 7 illustrates the total operation of the route search process by the navigation system of the embodiment.

FIG. 7 illustrates the total operation of the navigation system, when executing a route search after modifying the cost using the statistical cost, etc. When the search key of the remote control unit 4 is pressed, the route search processor 36 sets a start point and a destination (step 100), reads out the map data contained in the map sheet containing the specific range determined by the start point and the destination into the map buffer 16, and stores in the route search memory 40 all of the intersection network lists contained in the foregoing map data (step 101). Next, the route search processor 36 executes the modification process of a link cost (step 102), and modifies the "cost to the adjoining intersection" which is contained in the intersection network lists stored in the route search memory 40. The modification process of the link cost will be described later. When the modification of the link cost is completed, the route search processor 36 searches a guide route between the start point and the destination set at step 100 (step 103), and registers the passing nodes on the set guide route in the guide route memory 38 sequentially from the start point toward the destination (step 104).

Figure 8:
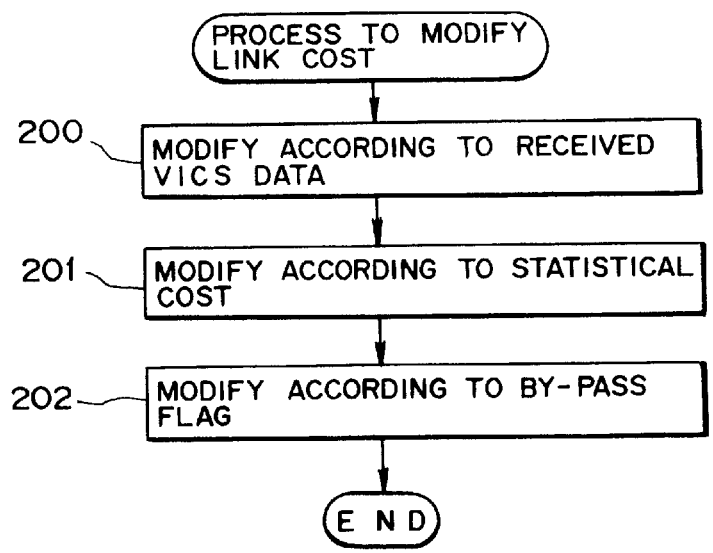
FIG. 8 illustrates a detailed process to modify a link cost.

FIG. 8 illustrates a detailed modification process of the link cost at the step 102 shown in FIG. 7. First, the route search processor 36 searches whether or not received VICS data are stored in the received data buffer 50, and if stored, modifies the "cost to the adjoining intersection" contained in the corresponding intersection network list (step 200). Concretely, in case a congestion information is stored as the VICS data, the route search processor 36 refers to the VICS conversion layer shown in FIG. 4 on the basis of the VICS link information contained in the foregoing congestion information. Thereby, the route search processor 36 determines one or more links as the object links for the congestion information, and multiplies a specific weighting factor (>1) by the cost of the link on the basis of the start point, length, and extent of the congestion contained in the congestion information, thus modifying the cost to increase.

Next, the route search processor 36 modifies the "cost to the adjoining intersection" of the corresponding intersection network list on the basis of the statistical cost contained in the link record (see FIG. 3 (C)) of the road data unit (step 201). This modification is made to the links whose cost have not been modified on the basis of the VICS data. Concretely, the route search processor 36 searches whether or not the link record contains the statistical cost, as to the links existing between the intersections corresponding to each of the intersection network lists and the adjoining intersections. If the statistical cost is contained, the route search processor 36 modifies to replace the "cost to the adjoining intersection" by this statistical cost.

Next, the route search processor 36 modifies the "cost to the adjoining intersection" of the corresponding intersection network list on the basis of the by-pass road flag (contained in the road attribute flag in FIG. 3 (C)) (step 202). This modification is made to the links whose cost have not been modified on the basis of the VICS data or the statistical cost. Concretely, the route search processor 36 searches whether or not the by-pass road flag in the road attribute flag of the link record is put out, as to the links existing between the intersections corresponding to each of the intersection network lists and the adjoining intersections. If the by-pass road flag is put out, the route search processor 36 multiplies a weighting factor smaller than 1 by the cost of the link to thereby modify the cost to decrease.

Thus, the modification of the link cost is carried out in such a manner that if there is a VICS data available, the priority is given to the VICS data, if there is not any, the priority is given to a statistical cost, and if the former two are not available, the priority is given to the by-pass road flag.

Figure 9:
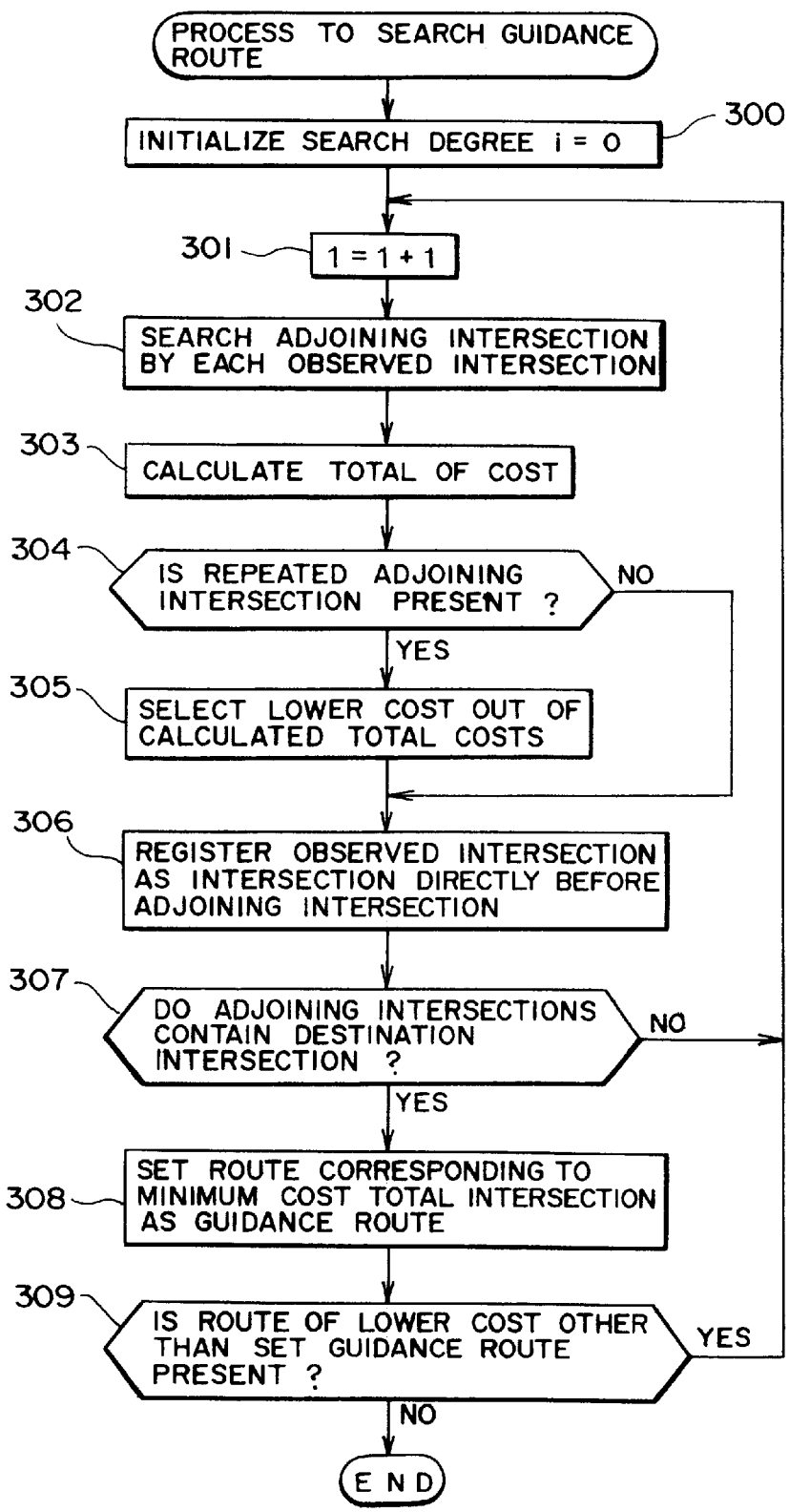
FIG. 9 is a flow chart illustrating a detailed operation procedure of the route search process carried out after the modification process of the link cost.

FIG. 9 is a flow chart illustrating a detailed operation procedure of the route search process carried out after the modification process of the link cost described above, which illustrates the operation procedure of an improved type lateral search method as an example. The route search processor 36 initializes the search degree i (step 300), and thereafter, adds "1" to i to update the search degree (step 301), and searches adjoining intersections as to each of the intersections (observed intersections) of the search degree i (step 302). For example, in case of the search degree i =1, the observing intersection is one intersection at the start point, and one or a plurality of intersections adjoining to the intersection at this start point are searched accordingly.

Next, the route search processor 36 calculates the total of cost to each of the searched adjoining intersections (step 303). The calculation of this cost can be obtained by adding the cost leading to each of the adjoining intersections contained in the intersection network list corresponding to the observed intersection stored in the route search memory 40 to the total of cost to the observed intersection. And, the cost from the observed intersection to each of the adjoining intersections is the one after it is modified in accordance with the procedure shown in FIG. 8, and the cost reflects the real congestion and other circumstances on the road. Further, the route search processor 36 determines whether or not repeated intersections are present in the searched adjoining intersections (step 304). If there is one, the route search processor 36 selects the route of the smaller cost out of the total of cost calculated at step 303 (step 305).

Next, the route search processor 36 registers the sequence number of the present observed intersection as the "sequence number of the intersection directly before the adjoining intersection" of the intersection network list in the route search memory 40, so as to correspond with each of the adjoining intersections (step 306). And, the route search processor 36 determines whether or not the adjoining intersections contain the intersection at the destination (step 307). If not, the process returns to step 301 to update the search degree i, and the same search process is repeated until the adjoining intersection reaches the intersection at the destination.

If any one of the searched adjoining intersections is the intersection at the destination in the search degree i =n, step 307 determines YES. Even though any one of the adjoining intersections reaches the intersection at the destination, the one does not necessarily make the total cost minimum; and if the destination is reached through one route, the route search process is not ended and is continued.

When the adjoining intersection reaches the destination, if there is a guide route to the destination through the other routes searched until that time, the route search processor 36 compares the cost total to the destination of the guide route newly searched with the cost total already available, and sets the guide route of the lower cost total as the optimum guide route to the destination at that time (step 308). Next, the route search processor 36 searches whether or not the cost totals to the adjoining intersections calculated at step 303 contain a lower cost total than the cost total of the optimum guide route at that time set at step 308 (step 309). If there is an adjoining intersection of a lower cost total, it shows a possibility to find out a guide route of a further lower cost total through the route search process, the process returns to step 301 to update the search degree i and repeats the search process.

If all of the cost totals to the adjoining intersections exceed the cost total of the optimum guide route already found out at that time, this guide route is determined as the final, and the route search process is ended. After the route search process is thus ended, the route search processor 36 reads out the "sequence number of the intersection directly before the adjoining intersection" of the intersection network list corresponding to the intersection at the destination stored in the route search memory 40, and then reads out the "sequence number of the intersection directly before the adjoining intersection" of the intersection network list corresponding to the intersection of the foregoing read out sequence number. In this manner, the route search process traces the intersections sequentially from the destination to the start point, and stores a series of node sets corresponding to the intersections in the guide route memory 38 (step 104 in FIG. 7).

Thus, the navigation system of this embodiment employs, as the cost between the intersections for the route search, the cost modified in accordance with the VICS data, the statistical cost in which the real road circumstances are taken into consideration, and the cost modified on the consideration that the road is a by-pass or not; and accordingly, the navigation system is able to carry out the route search that reflects the real road conditions of congestion, etc. If the modification according to the VICS data is impossible, (for example, if the car is outside the VICS reception area, or the car cannot receive the VICS data because of a poor reception condition, etc.), the navigation system is able to perform the route search by means of the statistical cost, and to obtain a guide route that is more accordant with the real condition. Further, if the statistical cost is not available (if the congestion of the links, etc., have not been searched), the system takes into account that the road is a by-pass or not, and is able to precedently set a guide route to avoid a road in an urban area that is likely to cause a severe congestion.

Figure 10:
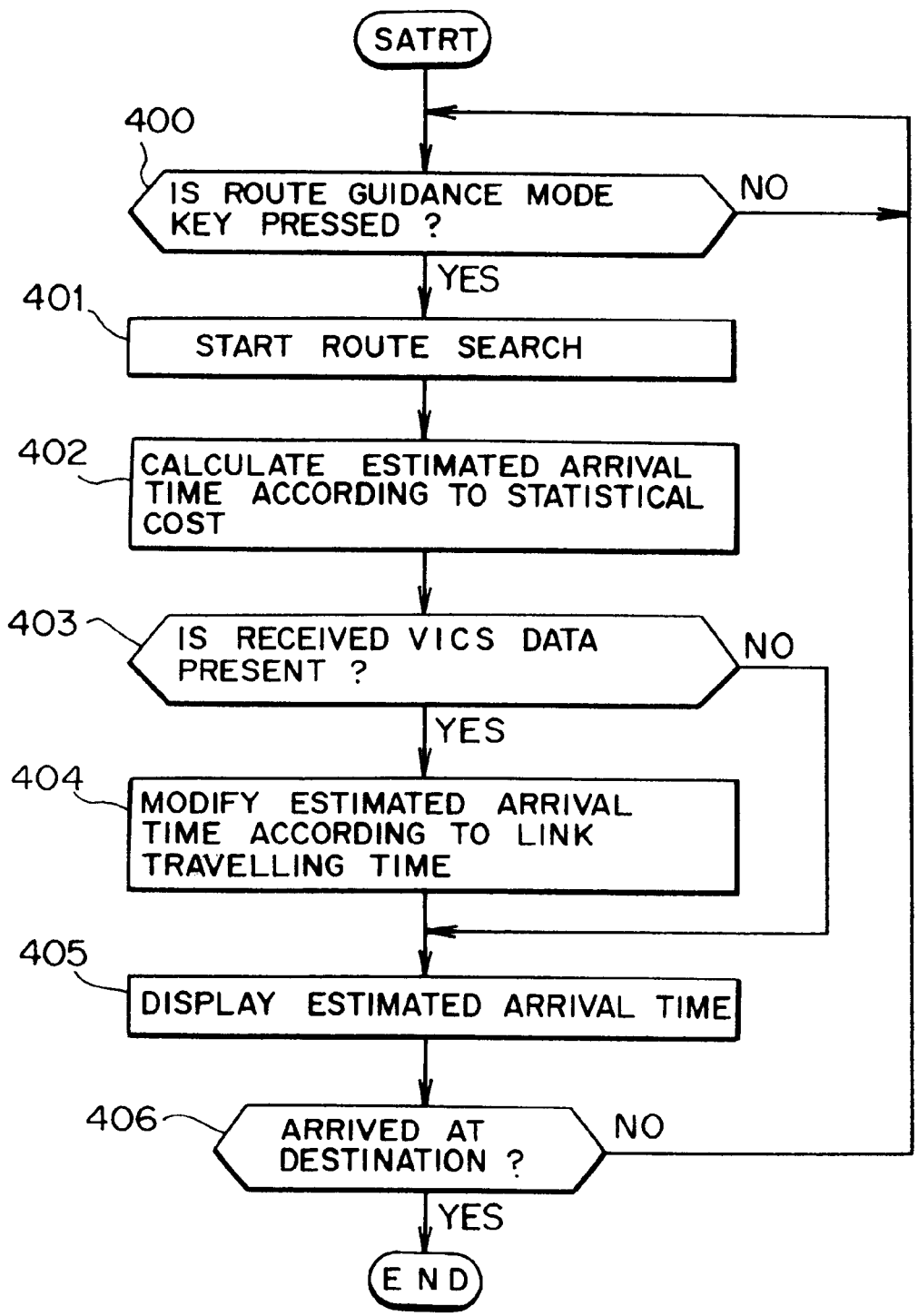
FIG. 10 is a flow chart illustrating an operation procedure of the navigation system during guiding a route.

The route search operation by the navigation system of this embodiment has been described hereinabove. Next, the operation will be described which displays to calculate an estimated time to reach a destination by using the foregoing statistical cost during guiding a route. FIG. 10 is a flow chart illustrating an operation procedure of the navigation system during guiding the route. When the route guide mode key of the remote control unit 4 is pressed, the route guide operation along a specific guide route is started (step 400, 401). Concretely, the guide route plotter 42 presents a guide route on the map image in the VRAM 22, and the mark generator 44 presents a vehicle position mark at the traveling position of the car to inform the driver of the present position of the car. And, if there is an intersection ahead in the traveling direction, the intersection guiding unit 46 plots an enlarged image of the intersection, and gives the driver the instruction of the direction to which the car should turn at the intersection.

In parallel to this route guide operation, the route search processor 36 calculates the estimated time to reach the destination by adding the total of the statistical costs (read out from the link records) of the links which the car has not yet passed through at the present time (step 402). If the link traveling time data (VICS data) is available in the received data buffer 50 at that time, the route search processor 36 modifies the estimated arrival time calculated at step 402 by using this data (step 403, 404). The estimated arrival time thus obtained is transmitted to the image synthesizer 26 through the mark generator 44, etc., and is put out on a part of screen on the display 9, thus informing the driver. Thus, a series of route search operations as such including the display of the estimated arrival time continues until the car reaches the destination (step 406).

Thus, the navigation system of this embodiment calculates an estimated time to reach a destination by adding the total of the statistical costs of the links which the car has not yet passed through, and further calculates by modifying the costs of the links in accordance with the VICS data if there is a VICS data available, therefore it is able to display the estimated time to reach the destination more precisely.

While the invention has been described by means of the foregoing embodiment, the invention is not confined to the embodiment, and various modifications are possible within the spirit and scope of the invention. For example, the statistical cost of the link shown in FIG. 3 (C) is made to indicate the required time to actually travel the link. However, the statistical cost may be expressed in the form of the factor to multiply the conventional cost calculated by using the average speed determined by the road type and road width, etc. Further, in the foregoing embodiment, while the route search is executed, the link cost of the intersection network list is modified on the basis of the VICS data, the statistical cost, or the by-pass road flag. However, the modification of the link cost may be made such that the intersection network list wherein the cost to the adjoining intersection is obtained by using the statistical cost is recorded in advance in the CD-ROM 2, and the modification is made, when this intersection network list is read out, on the basis of the VICS data as needed. Further, in the display operation during guiding the route shown in FIG. 10, an estimated time to reach a destination is calculated and displayed; however, a required time to a destination may be calculated and displayed, or the calculation result may be informed by a voice instead of a display.

As described above, according to the invention, the route search between a start point and a destination is carried out by using the search data including a statistical required time to express an actual time required for passing a road; and therefore, regardless of the presence of the traffic information transmitted from the vehicle information center, the cost calculation during the route search can accurately be carried out, which makes possible the route search that reflects the actual conditions of a road.

Further, as to a road wherein the statistical required time and the traffic information are not available, a road to be judged as a by-pass road on the basis of the by-pass flag is precedently set as a guide route, and a guide route can be set so as to be accordant with the actual conditions.

Further, according to the invention, when the car is guided to a destination in accordance with a guide route, the estimated arrival time at the destination or the required time to the destination is calculated on the basis of the statistical required time to represent an actual time required for passing through a road contained in the guide route, and an accurate estimated arrival time wherein the actual road conditions are taken into account can be displayed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation system comprising:
   position detection means for detecting a present position of a vehicle;
   destination input means for identifying a destination;
   map data storage means for storing road data for a plurality of roads, including a statistical required time for at least some of the roads where the statistical required time associated with a particular road represents the time required for actually traveling the road, statistically obtained, and is not based on traffic information transmitted to the vehicle from outside the vehicles and by-pass road information to indicate whether or not a road is a by-pass road; and
   route search processing means for searching a route from a present position detected by the position detection means to a destination identified by the destination input means on the basis of the road data, wherein the route search processing means executes a route search by using a time to pass through a road, obtained on the basis of received traffic information when traffic information transmitted from outside the vehicle is received, and the statistical required time, when the traffic information is not available on a road and the statistical required time is available;
   wherein the statistical required time data is pre-set in the map data storage means and is determined without the involvement of a user, and the route search processing means gives priority to a road identified as a by-pass road in searching a guide route, if the statistical required time and the traffic information is not available for the road.

2. A navigation system as claimed in claim 1, wherein the statistical required time is a time statistically obtained and required for passing through a road unit indicated by a start point and an end point.

3. A navigation system as claimed in claim 2, wherein the road unit is a road link between intersections stored in the map data storage means.

4. A navigation system as claimed in claim 3, wherein the route search processing means includes a conversion table for converting a road link contained in the traffic information transmitted from outside the vehicle into a corresponding road link stored in the map data storage means.

5. A navigation system comprising:
   position detection means for detecting a present position of a vehicle;
   destination input means for identifying a destination;
   map data storage means for storing road data for a plurality of roads, including a statistical required time for at least some of the roads where the statistical required time associated with a particular road represents the time required for actually traveling the road, statistically obtained, and is not based on traffic information transmitted to the vehicle from outside the vehicle, and by-pass road information to indicate whether or not a road is a by-pass road;
   route search processing means for searching a guide route from a present position detected by the position detection means to a destination identified by the destination input means on the basis of the road data;
   route guiding means for guiding a driver to the destination in accordance with the guide route searched by the route search processing means; and
   required time calculation means for calculating an estimated arrival time at the destination or a required time to reach the destination, wherein the required time calculation means calculates an estimated arrival time at the destination or a required time to reach the destination by using a time to pass through a road, obtained on the basis of received traffic information when traffic information transmitted from outside the vehicle is received, and the statistical required time, when the traffic information is not available on a road and the statistical required time is available;
   wherein the statistical required time data is pre-set in the map data storage means and is determined without the involvement of a user, and as to a road identified as a by-pass road where the statistical required time and the traffic information is not available, the required time calculation means calculates a required time to pass through a unit distance that is shorter than a required time to pass through the unit distance on a non-by-pass road.

6. A navigation system as claimed in claim 5, wherein the statistical required time is a time statistically obtained and required for passing through a road unit indicated by a start point and an end point.

7. A navigation system as claimed in claim 6, wherein the road unit is a road link between intersections stored in the map data storage means.

8. A navigation system as claimed in claim 7, wherein the route search processing means includes a conversion table for converting a road link contained in the traffic information transmitted from outside the vehicle into a corresponding road link stored in the map data storage means.

9. A method for searching a route, comprising the steps of:
   identifying a start point and a destination;
   reading out road data from a map data storage means containing road data for a plurality of roads, including a statistical required time for at least some of the roads where the statistical required time associated with a particular road represents the time required for actually traveling the road, statistically obtained, and is not based on traffic information transmitted to the vehicle from outside the vehicle, and by-pass road information to indicate whether or not a road is a by-pass road; and
   searching a route between the start point and the destination on the basis of the road data, wherein the route is searched by using a time to pass through a road obtained on the basis of received traffic information when traffic information transmitted from outside the vehicle is received, and the statistical required time when the traffic information is not available on a road and the statistical required time is available;
   wherein the statistical required time data is pre-set in the map data storage means and is determined without the involvement of a users and as to a road where the statistical required time and the traffic information is not available, a road identified as a by-pass road on the basis of the by-pass road information is given priority in searching a guide route.

10. A method for searching a route comprising the steps of:

identifying a start point and a destination;

reading out road data from a map data storage means containing road data for a plurality of roads, including a statistical required time for at least some of the roads where the statistical required time associated with a particular road represents the time required for actually traveling the road, statistically obtained, and is not based on traffic information transmitted to the vehicle from outside the vehicle, and by-pass road information to indicate whether or not a road is a by-pass road;

searching a guide route from the start point to the destination on the basis of the road data; and calculating an estimated arrival time at the destination or a required time to reach the destination when guiding the driver to the destination in accordance with the searched guide route, wherein an estimated arrival time at the destination or a required time to reach the destination is calculated by using a time to pass through a road obtained on the basis of received traffic information when traffic information transmitted from outside a vehicle is received, and the statistical required time when the traffic information is not available on a road and the statistical required time is available;

wherein the statistical required time data is pre-set in the map data storage means and is determined without the involvement of a user, and as to a road identified as a by-pass road where the statistical required time and the traffic information is not available, a required time to pass through a unit distance is set shorter than a required time to pass through the unit distance on a non-by-pass road.

11. A method for searching a route as claimed in claim 10, wherein the statistical required time is a time statistically obtained and required for passing through a road unit indicated by a start point and an end point.

12. A method for searching a route as claimed in claim 11, wherein the road unit is a road link between intersections stored in the map data storage means.

* * * * *